United States Patent [19]
Ek

[11] Patent Number: 5,190,610
[45] Date of Patent: Mar. 2, 1993

[54] METHOD FOR PRODUCING A CERAMIC FIBER-METAL LAMINATE

[76] Inventor: Roger B. Ek, 2711-226th Ave. SE., Issaquah, Wash. 98027

[21] Appl. No.: 784,131

[22] Filed: Oct. 29, 1991

Related U.S. Application Data

[63] Continuation of Ser. No. 433,130, Nov. 8, 1989, abandoned.

[51] Int. Cl.⁵ ............................................. B32B 31/00
[52] U.S. Cl. ...................................... 156/89; 427/207.1
[58] Field of Search ....................... 156/89; 427/207.1; 428/453; 501/95

[56] References Cited

U.S. PATENT DOCUMENTS

| | | | |
|---|---|---|---|
| 2,318,184 | 5/1943 | Rojas | 428/453 X |
| 2,856,302 | 10/1958 | Reuter | 106/38.3 |
| 3,629,116 | 12/1971 | Gartner | 501/95 X |
| 3,702,279 | 11/1972 | Kingston | 156/89 |
| 3,752,683 | 8/1973 | Hawthorne | 501/95 |
| 3,835,054 | 9/1974 | Olewinski | 501/95 X |
| 3,861,947 | 1/1975 | Hamling | 428/378 |
| 3,968,281 | 7/1976 | Erickson | 428/35.8 |
| 4,041,199 | 8/1977 | Cartwright | 428/35.8 |
| 4,090,881 | 5/1978 | Keel et al. | 501/95 |
| 4,221,672 | 9/1980 | McWilliams | 428/315.5 |
| 4,395,453 | 7/1983 | Lines, Jr. et al. | 428/216 |
| 4,447,345 | 5/1984 | Kummermehr et al. | 252/62 |

Primary Examiner—David A. Simmons
Assistant Examiner—James J. Engel, Jr.
Attorney, Agent, or Firm—Christensen, O'Connor, Johnson & Kindness

[57] ABSTRACT

A method for producing an inorganic fiber-metal laminate, comprising bonding a ceramic fiber matrix to a metal substrate with an inorganic binder. A first side of the metal substrate is preconditioned by contacting the metal substrate with a preconditioning sol of the inorganic binder. A first side of the inorganic fiber matrix is then saturated with a binder sol of the inorganic binder. The saturated first side of the inorganic fiber matrix is applied to the preconditioned first side of the metal substrate to form a laminate. The binder sol is gelled and dried to firmly bond the laminate.

32 Claims, No Drawings

METHOD FOR PRODUCING A CERAMIC FIBER-METAL LAMINATE

This application is a continuation application based on prior copending application Ser. No. 07/433,130, filed on Nov. 8, 1989, now abandoned.

BACKGROUND OF THE INVENTION

The present invention relates to inorganic fiber-metal laminates and, more particularly, to a laminate formed from a ceramic fiber matrix bonded to a metal substrate with an inorganic binder and, even more particularly, to a ceramic fiber matrix-metal substrate laminate formed by using a very low weight percentage of inorganic binder to retain the original properties of the ceramic fiber matrix.

The high heat resistance and insulative properties of ceramic fibers have led to the development of many methods for making ceramic fiber insulation materials. Typically ceramic fibers, such as aluminosilicate, silica, alumina, zirconia, or glass fibers, are bound to each other by utilization of an inorganic binding agent such as silica, alumina, or zirconia. The binding agent is typically introduced to the fibers in the form of a colloidal dispersion, or sol, of the inorganic binding agent in a liquid dispersant. In addition, an organic material such as starch or metal fillers may be added to the binding agent, as taught by U.S. Pat. No. 4,041,199, issued to Cartwright. A ceramic fiber matrix is typically formed by confining a slurry of fiber and binder sol in the desired form. The binder sol is then gelled and dried to remove the liquid dispersant. Alternatively, the ceramic fibers are sometimes bound together mechanically.

The ceramic fiber matrix resulting from a conventional process exhibits good temperature resistance, but the utilization of the matrix as an insulation material is limited by the typically high content of inorganic binder and other fillers that must be utilized. The inorganic binder and fillers typically constitute between five and ninety percent by weight of the matrix. This high percentage of binder tends to stiffen the ceramic matrix, making it difficult to form around irregularly shaped objects, and increases the matrix density, making it less desirable for some applications, such as aircraft manufacture.

Conventional ceramic fiber matrices are generally capable of withstanding very high temperature, typically in excess of 1000° C. However, these ceramic fiber matrices are not gas impermeable, precluding their use in some application, such as explosion proof or poisonous vapor-proof firewall construction. Further, if organic constituents have been added to the binding agent, conventional ceramic fiber matrices produce off-gases when heated to combustion temperatures.

Several methods have previously been developed for making fiber-metal composites to achieve gas impermeability and to facilitate installation of fiber insulation. One such laminate is disclosed by U.S. Pat. No. 4,395,453, issued to Linez, Jr. et al., which discloses the binding of cellulose fiber plies to aluminum foil plies, to form a heat-resistant laminate. An adhesive such as a silicate or polyethylene is used to bind the plies and produce a stiff laminate. The inclusion of metal plies in a fiber-metal laminate creates a heat-resistant barrier that is gas and liquid impermeable. However, the use of cellulose fibers limits the upper temperature range of the laminate. Off-gases would be produced by both the cellulose fiber and the polyethylene adhesive at elevated temperatures.

A flexible ceramic fiber-metal laminate has been disclosed by U.S. Pat. No. 4,447,345, issued to Kummermehr et al. A fiber matrix consisting of aluminosilicate fibers bound together by a microporous silica aerogel was laminated to a foil or sheet of metal. The silica aerogel represented between forty and ninety percent of the finished weight of the fiber matrix, greatly affecting the properties of the raw ceramic fiber utilized. In addition, a separate glue was required to attach the fiber matrix to the metal, potentially limiting the upper temperature range limit of the laminate.

These conventional fiber-metal laminates utilize thin sheets or foils of metal. Ceramic fiber-metal laminates utilizing thicker or irregularly shaped metal substrates have not previously been developed, restricting the ability to construct integral ceramic fiber insulated structural members.

SUMMARY OF THE INVENTION

The present invention provides a method for producing an inorganic fiber-metal laminate, such as a ceramic fiber-metal laminate, by binding a preconditioned metal substrate to an inorganic fiber matrix with a small quantity of an inorganic binder. The resultant laminate is firmly bound and the physical properties of the laminate's fiber matrix portion are substantially unchanged from those of the unbound fiber matrix. The inorganic fiber-metal laminate produced in accordance with the present invention displays high heat and cold resistance and is gas impermeable. Due to the low binder concentration used, the laminate has a low density and can be made to be either highly resilient or stiff, as desired. The laminate exhibits substantially no off-gassing upon exposure to elevated temperature, and utilizes no adhesive agent other than the inorganic binder.

In the preferred embodiment of the present invention, a preformed ceramic fiber matrix of the desired thickness is utilized. The ceramic fibers preferably are formed from alumina, silica, aluminosilicates, spinel, zirconia, or glass. If the preformed fiber matrix has been bound with organic binders, it is heated in an oxidizing atmosphere to burn out the organic constituents.

A binder sol of inorganic binder is used to bind the ceramic fibers to themselves and to a metal substrate. The binder sol preferably contains a colloidal silica, zirconia, or alumina binder dispersed in water, with the binder constituting less than 4.3 percent by weight of the binder sol.

The metal substrate may be of any thickness ranging from a thin and flexible foil to an extruded structural formation, and may be formed from aluminum, aluminum alloys, stainless steels, refractory alloys containing nickel, chromium, cobalt, tungsten, and columbium, for example, or other metals as desired. The metal substrate is cleaned as needed and is preconditioned prior to binding by exposure to a pH-adjusted solution of a preconditioning sol containing the inorganic binder.

A first side of the fiber matrix is saturated with the binder sol and applied to a preconditioned first side of the metal substrate. For relatively thin fiber matrix thicknesses of less than ¼ inch, the dry fiber matrix may be applied to the metal substrate, followed by introduction of the sol to the fiber matrix.

The joined fiber-metal laminate is dried to gel the binder sol. Preferably, this is done by heating a second side of the metal substrate, causing the inorganic binder to migrate through the fiber matrix toward the metal-fiber interface. This results in a relatively high concentration of binder at the interface and a strong bond. Heating from the metal side also correspondingly lowers the concentration of binder in the remainder of the fiber matrix, resulting in the fiber matrix retaining substantially its original properties. The concentration of inorganic binder in the binder sol may be varied to adjust the amount of inorganic binder remaining in the fiber matrix and the laminate's ultimate flexibility.

After gelling the inorganic binder sol, the laminate is further dried at a temperature ranging from the gel temperature up to the temperature where all gases are driven off, depending upon the expected service environment of the laminate, to remove the water base of the binder sol.

Additional lamina of metal or fiber may then be joined by repeating the above method steps to achieve the final desired laminate configuration.

The inorganic binder in the resulting laminate preferably comprises less than one percent by weight of the dried inorganic fiber matrix. The inorganic fiber matrix may have a density of 0.5 pound or more per cubic foot, as desired.

DETAILED DESCRIPTION OF THE PREFERRED EMBODIMENTS

An inorganic fiber-metal laminate is manufactured in accordance with the method of the present invention by preconditioning a metal substrate with a preconditioning sol of an inorganic binder, saturating one side of an inorganic fiber matrix with a binder sol of the inorganic binder, applying the saturated side of the inorganic fiber matrix to a preconditioned side of the metal substrate, gelling the binder sol, and drying the laminate to remove the liquid dispersant from the gelled binder sol. The method can be utilized to form laminates from a variety of inorganic fibers, metal substrates, and inorganic binder combinations.

The inorganic fiber matrix preferably contains ceramic fibers, such as refractory fibers formed from aluminosilicates, alumina, silica, zircon, zirconia, or spinels that contain chromium, or glass fibers ("fiber glass"). The individual ceramic fibers must be bound to each other to form a fiber matrix, as well as ultimately being bonded to the metal substrate. Most conveniently, a preformed fiber matrix is used wherein the individual fibers are bound to each other to form the desired shaped matrix, such as a paper, felt, or blanket. The individual ceramic fibers in the preformed matrix may be prebound to each other through the use of inorganic binders, organic binders, or mechanically, including woven or needled products.

Preformed ceramic fiber plies are readily available in a variety of densities and may be selected in accordance with the ultimate desired properties of the laminated end product. Processing of the inorganic fiber matrix in accordance with the present invention yields a laminate wherein the fiber matrix's properties are only minimally changed from those of the original fiber matrix before processing.

Suitable preformed fiber matrices are available from Lydall, Inc., under the trademark LYTHERM; Thermal Ceramics Inc., under the trademark KAOWOOL; Standard Oil, under the trademark FIBERFRAX; Manville Corp. under the trademarks CERAWOOL, CERAFORM, CERACHROME, CERAFIBER, and CERABLANKET; ICI Americas, Inc., under the trademark SAFFIL; and Industrial Insulations, Inc., under the trademark MAXFIRE. Suitable fiberglass products are available from Manville Corp. and Owens Corning Corp. under various trademarks related to final product use. In addition, conventional slurry or vacuum-forming techniques may be used to manufacture preformed fiber matrices from individual fibers.

If the fiber matrix, preformed or otherwise manufactured, contains organic binder constituents, the matrix must be heat treated to burn off the organic binders. This burn-off step assures that the finished laminate may be utilized at high temperatures without producing organic off-gases. Heat treating of the ceramic fiber matrix is preferably accomplished by heating the fiber to a minimum temperature of 450° F. in an oxidizing atmosphere to combust the organic constituents. Even more preferably, the fiber matrix is heated to a temperature of 600° F. for fiberglass materials, and 1250° F. for refractory fiber materials, in an atmosphere containing excess oxygen to assure complete combustion of organics and removal of carbon combustion byproducts. The resulting treated fiber matrix will not only be free of off-gases when subsequently heated, but will be amenable to binding with an inorganic binder to form the desired laminate.

The inorganic fiber matrix is bonded to a metal substrate to form the laminate. The metal substrate may be formed from a variety of metals, including aluminum, aluminum alloys, stainless steels, and refractory alloys that contain nickel, chromium, tungsten, cobalt, and columbium, for example. The metal substrate may be in the form of a thin flexible foil, a sheet, or a contoured structural shape, such as a beam or truss. The metal substrate should preferably be free of any paint, anodization, or other coating.

An inorganic binder is used to bind the fiber matrix to the metal substrate, as well as to further bind the individual fibers in the matrix together. Preferably, the binder is introduced to the fiber matrix in the form of a colloidal sol, with particles of the inorganic binder dispersed in a liquid dispersant, preferably water. Suitable inorganic binders include metal oxides such as silica, zirconia, or alumina prepared as colloidal aqueous suspensions. A suitable aqueous colloidal silica sol is available from Dupont under the trademark LUDOX HS30 or HS40. A suitable aqueous alumina sol is available from P.Q. Corp., Nyacol Div., under the trademark NYACOL. Alumina sols are most preferred for bonding alumina, alumina silicate, or silica fiber matrices to aluminum or aluminum alloy metal substrates.

The present invention utilizes a sol of the inorganic binder for two purposes. First, the sol is used to further bind individual ceramic fibers together and to bind the fiber matrix to the metal substrate. In this context, the sol of the inorganic binder shall hereinafter be referred to as the "binder sol". Second, the same type of sol of the inorganic binder is used to precondition the metal substrate. The concentration of inorganic binder in the sol when so used may differ from that used for binding the laminate, and may be pH adjusted. When so used, the sol of the inorganic binder shall hereinafter be referred to as the "preconditioning sol".

To effectively bind the materials and precondition the substrate, the metal oxide sols must form compatible gels with the fiber matrix and the surface of the metal substrate. In general, the metal in the metal oxide sol should be the same as the principal metal or alloying elements in the fiber matrix and in the metal substrate.

For example, an alumina sol may be used to precondition an aluminum substrate and for binding an alumina matrix to an aluminum substrate. Similarly, chromium oxide or spinel sols (magnesia-chromia) can be employed to precondition and bond laminates wherein nickel-chromium alloys are employed in the matrix and/or substrate.

The concentration of binder in the binder sol may be varied by dilution with demineralized water, depending on the flexibility desired for the laminate end product. As a general rule, the higher the concentration of the binder used, the higher the stiffness of the laminate produced. Correspondingly, the lower the concentration of binder, the more flexible the laminate is and the closer the properties of the bound fiber matrix are to those of the unbound fiber matrix. To achieve a bound fiber matrix with properties that do not greatly differ from those of the original matrix, it is desirable that the binder constitute less than ten percent of the combined weight of the dried binder plus fiber matrix. Even more preferably, the binder should constitute less than one percent of the combined weight of the dried binder and fiber matrix.

The method steps for treating and joining the metal substrate and fiber matrix depend on the thickness of the fiber matrix utilized, the cleanliness of the metal substrate, and the type of preconditioning and binder sol used. By way of example, a first preferred embodiment is described, wherein an aqueous silica sol is used to bind a preformed fiber ply of less than ¼ inch thickness to a metal substrate. Variations on this embodiment to reflect differing raw materials will then be presented.

The aqueous silica sol is prepared using standard industry methods or by diluting a commercially available sol. The concentration of the silica in the preconditioning sol is not critical as long as a preconditioning coating can be formed on the surface of the metal substrate. It is preferred that a silica preconditioning sol contain between 0.18 percent and 5.0 percent silica by weight. The weight percent of silica in the binder sol is more preferably in the range between 0.36 percent and 3.6 percent, although higher percentages may be utilized if it is desired to greatly stiffen the ceramic fiber matrix. To obtain a flexible, resilient laminate it is most preferred to use an aqueous silica sol containing 1.0 percent to 2.5 percent silica by weight.

The metal substrate is cleaned and preconditioned to prepare it for bonding. To remove any oils used during the manufacture of the metal substrate, the surface to be bound may be cleaned by exposure to a hydrocarbon solvent, such as acetone. Alternatively, an acid, such as sulfuric acid, or a base, such as sodium hydroxide, or a detergent may be utilized as the cleaning agent. For the case of a small metal substrate or a flexible metal substrate, such as aluminum foil, the entire metal substrate may be immersed in the cleaning solvent or agent. The metal substrate is then rinsed with demineralized water to remove any residual solvent or cleaning agent. Sandblasting techniques may be alternately used for substrate cleaning where practical.

The clean metal substrate is then preconditioned for bonding by exposing it to a preconditioning sol. When a silica sol is used as the binder sol, the preconditioning sol is also a silica sol. This preconditioning step is critical to activate the metal substrate and allow for a strong metal to fiber bond. In the most preferred embodiment, a preconditioning sol with a silica content of 1.1 percent by weight is prepared, and has a nominal pH of approximately $9.6 \pm 0.2$. The metal substrate must be exposed to this sol for a minimum of five minutes, and preferably for one hour or greater, to activate the metal substrate. The degree of activation increases with length of exposure to the preconditioning sol. In order to speed the preconditioning process, the pH of the 1.1 weight percent silica sol is preferably adjusted by the addition of a base, such as ammonium, sodium, potassium or lithium hydroxide, to achieve a pH of approximately $10.0 \pm 0.2$. Again, small metal substrates or flexible foils may be completely immersed in the preconditioning sol, while larger, inflexible metal substrates are coated by sprayer or brushing on the preconditioning sol. If a lower concentration of silica, or a non-pH-adjusted solution, is utilized the exposure time lengthens for the same degree of activation. Water placed on a properly preconditioned metal surface will fully wet the surface, rather than beading up on the surface. If the laminate is not to be assembled for some time, the preconditioned metal substrate may be rinsed, dried, and stored for later use without necessitating any further preconditioning.

To bind the ceramic fiber matrix to the metal substrate, a first side of the ceramic fiber matrix must be saturated with the binder sol. The sol-saturated first side of the fiber matrix may then be applied to a preconditioned first side of the metal substrate to form the laminate. The procedure for saturating the first side of the fiber matrix varies with the thickness of the matrix. In the present first preferred embodiment of a fiber matrix having a thickness of less than ¼ inch, the saturation of the fiber matrix and the applying of the fiber matrix to the metal substrate can be accomplished simultaneously. The first side of the dry fiber matrix is laid upon the preconditioned first side of the metal substrate. The binder sol is then sprayed or poured onto the exposed second side of the fiber matrix. A hard cylindrical roller, such as a metal or glass tube, is then rolled across the top of the ceramic matrix to saturate the entire depth of the matrix and to squeeze out any excess sol. Alternately, a squeegee or other device for applying pressure may be used. When fully saturated, the sol will have been forced through the matrix all the way to the metal-fiber interface.

The joined wet fiber matrix and metal substrate are then heated to gel the colloidal silica. Gelling may be accomplished by exposing the laminate to a heat source or placing the laminate into an oven, and maintaining the ceramic fiber matrix portion of the laminate at a temperature ranging between approximately 50° F. and 212° F. (10° C. to 100° C.). Even more preferably, the fiber matrix portion is heated to a temperature ranging between 104° F. and 160° F. (40° C. to 70° C.). The low temperatures of these preferred ranges are required to remove the water without causing formation of water vapor bubbles between the metal substrate, thus avoiding nonuniform bonding. The gelling process may be hastened by drawing a low vacuum on the laminate, or introducing an acid gas such as carbon dioxide.

The most preferred method of heating the wet laminate to gel the binder sol is the application of heat to only the exposed second surface of the metal substrate. This may be accomplished by laying the second surface of the metal substrate on a heated hot plate, or by hot air convection in contact with the second surface of the metal substrate. The heat is conducted through the metal substrate to the metal-fiber interface, and then through the fiber matrix. The heat source used is adjusted to maintain the temperature of the fiber matrix in proximity to the metal-fiber interface within the preferred range noted above. The application of heat to the metal substrate results in the migration of the colloidal silica solution, during drying, to the fiber-metal interface. The migration of the binder is due to wicking of the sol through the fiber matrix along the temperature gradient toward the warmest location adjacent the heated metal substrate. This one-dimensional heating results in the concentration of silica in the fiber matrix being highest at the interface, where bonding is desired, and decreasing across the thickness of the fiber matrix toward the second surface of the matrix. The decrease in binder in the body of the matrix results in only a minimal change occurring in the physical properties of the matrix. The use of one-dimensional heating allows for a lower concentration of binder to achieve the same bond strength that would otherwise be achieved through use of a higher concentration, and thus allows for a more flexible, yet strongly bound, laminate. When the metal substrate is a thin foil, the entire laminate will be flexible when produced by the method of this invention. When a rigid metal substrate, such as metal sheet, is used, the entire laminate will not be flexible but the ceramic fiber matrix portion of the laminate will retain its original resiliency.

To finish processing of the laminate, the gelled sol in the fiber-metal laminate is dried to remove remaining water. Drying may be accomplished by maintaining the laminate under the gel temperatures described above. However, if the laminate is intended for service under higher temperatures, it may be desired to dry the laminate at an elevated temperature somewhat higher than the expected service temperature. Drying at an elevated temperature assures that no chemically bound water will off-gas from the gelled laminate during use. When an aqueous sol has been used, the laminate may be heated to temperatures in excess of 100° C. (212° F.) to ensure removal all residual moisture. This is preferably done by gradually raising the temperature over a period of time to avoid rapid devolatilization. A suitable drying temperature would be the temperature below which accelerated oxidation and sealing degrade the bonding system herein employed.

After drying of the laminate is completed, the ceramic fiber matrix is strongly bonded to the metal substrate along the metal-fiber interface. No additional adhesives are required to bind the lamina. Since only inorganic materials have been used, the laminate is extremely heat resistant and will not produce off-gases when heated to elevated temperatures.

The steps of the first preferred embodiment described above may be varied to accommodate differing raw materials, as shall presently be described.

In the case of the application of a thin, or less than ¼ inch thick, ceramic fiber matrix to a metal substrate, it is possible to precondition the metal substrate after application of the ceramic fiber matrix onto the metal substrate, rather than before. This is accomplished by applying the dry ceramic fiber matrix to the clean metal substrate, saturating the ceramic fiber matrix with the binder sol, and allowing the applied ceramic matrix and metal substrate to rest before gelling. Since the binder sol will not have been pH adjusted, the length of preconditioning time before gelling must be lengthened accordingly. After suitable time for preconditioning has elapsed, the fiber-metal laminate is gelled and dried as in the above first-preferred embodiment.

When utilizing thick ceramic fiber matrices, having a thickness of greater than ¼ inch, the first side of the fiber matrix must be saturated with binder sol prior to assembly with the metal substrate. The preferred method of applying the binder sol to such thick laminates is to introduce sufficient binder sol to the fiber matrix to saturate the first side of the matrix for a depth of approximately ¼ inch. A first side of a previously preconditioned metal substrate is then also wetted with the binder sol, and the saturated first side of the ceramic fiber matrix is applied with the wetted first side of the metal substrate. The laminate is then completed by carrying out the gelling and drying steps discussed in the above first-preferred embodiment. This preferred method of assembly for thick fiber matrices leaves the second surface of the ceramic fiber matrix unaffected by the sol to that it retains its original resilience.

If it is desired too have a stiffer exposed second surface of the fiber matrix, additional binder sol may be applied to the second surface of the fiber matrix after the laminate has been dried. The second surface of the ceramic fiber matrix is then exposed to a heat source to gel this additional sol, again most preferably at a temperature of 104° F. to 160° F. (40° C. to 70° C.), causing the additional binder to migrate to the second surface of the matrix. The additional sol is then further dried as in the steps previously discussed. The migration of the silica to the second surface of the matrix results in a case hardening of that surface.

The above preferred embodiments have been described utilizing an aqueous silica sol as the binder sol and preconditioning sol. Other preferred binder/preconditioning sols that can be used in accordance with the invention are aqueous alumina sols or aqueous zirconia sols. These alternative preferred sols also provide for strong bonding of the fiber matrix to the metal substrate, and are processed following the same method steps and conditions as for aqueous silica sols, with the following exceptions.

Aqueous alumina sols are particularly well suited for bonding ceramic fiber matrices to metals that contain significant quantities of aluminum. The preferred concentration strength for an alumina binder sol is between 0.36 percent and 3.6 percent alumina by weight. In order to prepare a flexible laminate, the most preferred alumina binder sol concentration range is 0.6 percent to 2.5 percent alumina by weight. The preferred concentration for an alumina preconditioning sol is 0.18 to 5.0 weight percent alumina.

When using an aqueous zirconia sol, the preferred concentration for the zirconia binder sol is between 0.36 and 4.3 percent zirconia by weight. In order to prepare a flexible laminate, the most preferred zirconia binder sol concentration is 1.0 to 3.5 percent zirconia by weight. The preferred concentration for a zirconia preconditioning sol is 0.18 to 5.0 weight percent zirconia.

Table I summarizes the concentration strengths of binders that are most preferred to bond ceramic fiber matrices to metal substrates in accordance with the present invention.

TABLE I

| | Inorganic Binder Sols | |
|---|---|---|
| | Preferred Wt. % Binder | Most Preferred Wt. % Binder |
| Aqueous Silica Sol | 0.36% to 3.6% | 1.0% to 2.5% |
| Aqueous | 0.36% to 3.6% | 0.6% to 2.5% |

TABLE I-continued

| | Inorganic Binder Sols | |
|---|---|---|
| | Preferred Wt. % Binder | Most Preferred Wt. % Binder |
| Alumina Sol Aqueous Zirconia Sol | 0.36% to 4.3% | 1.0% to 3.5% |

When an alumina binder sol is used, an alumina preconditioning sol is also preferably used to precondition the metal substrate. As colloidal alumina sols are nominally acidic, no adjustment of the pH of the sol is required to provide for preconditioning. As when using a silica preconditioning sol, the duration of exposure of the metal substrate to the preconditioning sol increases with decreasing concentration of alumina. One suitable preconditioning sol contains 1.8 percent alumina by weight and has a pH of approximately 3.6. The metal substrate is preferably exposed to this preconditioning sol for a minimum of one hour to activate the substrate. The remainder of the process steps are identical to those discussed above for laminates utilizing silica sol binder solutions.

The above-described preferred embodiments of the present invention utilize one lamina of a ceramic fiber matrix bonded to one lamina of a metal substrate. It is also possible to bond one or more additional lamina of metal or fiber to this laminate, as desired.

As an example, a second ceramic fiber matrix may be bonded to the exposed metal surface of a metal-fiber laminate to produce a laminate with a metal substrate core sandwiched between ceramic fiber matrices. The exposed second metal side of a dried metal-fiber laminate, produced as in any one of the above preferred embodiments, is preconditioned by exposure to a suitable preconditioning sol. The same type and concentration of preconditioning sol and binder sol as was used to bond the first fiber matrix is again utilized. A first side of the second fiber matrix is saturated with binder sol, and the saturated first side of the second fiber matrix is applied to the preconditioned second side of the metal substrate. This procedure is followed for fiber matrices of greater than ¼ inch thickness. For ceramic matrices of less than ¼ inch thickness, the dry second fiber matrix may be applied to the second side of the metal substrate, followed by introduction of the binder sol and rolling or squeegeeing to saturate.

Gelling of the additional binder sol in the second fiber matrix is preferably accomplished by heating the exposed second side of the first fiber matrix. Heat conducts through the first fiber matrix, the metal substrate, and to the interface between the second side of the metal substrate and the first side of the second fiber matrix. This results in the migration of binder to this interface, as was previously discussed. After gelling, this binder sol is dried to complete the built-up laminate.

Another example of a built-up laminate is formed by bonding a second metal substrate to the exposed second side of the fiber matrix portion of a dried metal-fiber laminate. This is accomplished by saturating the exposed second side of the bonded fiber matrix with a suitable binder sol, and contacting that saturated second side with a preconditioned first side of the second metal substrate. Gelling of the additional binder sol is then accomplished by heating the exposed second side of the second metal substrate, followed by drying of the built-up laminate.

Additional layers of ceramic fiber matrices or metal substrates may be further applied to the laminate to construct multi-ply laminates as desired to achieve required dimensional and structural requirements.

Ceramic fiber laminates produced in accordance with the present invention display resistance to cryogenic temperatures as well as very high temperatures due to the use of only inorganic materials. The laminates are gas impermeable due to the metal substrate. No off-gases are produced when laminates that have been fully dried, as described previously, are heated to temperatures in excess of 100° C. (212° F.); any degree of dryness may be achieved by this step. The bond interface between the ceramic fiber matrix and metal substrates are strong and will not degrade upon heat exposure. The ceramic fiber matrix portion of the laminate retains virtually its original properties due to the low binder concentrations used, and may have a density of 0.5 pound per cubic foot or more depending on the density of the initial ceramic fiber matrix selected. When manufactured in accordance with the method of the present invention, the ceramic fiber portion of the laminate contains less than 10 percent by weight inorganic binder. If binder sol within the most preferred concentration range for flexible laminates (Table I) has been utilized, the ceramic fiber portion of the laminate will contain less than 1 percent by weight inorganic binder.

By adjusting the flexibility of the ceramic fiber-metal laminate as discussed above and utilizing the appropriate thicknesses and number of metal and fiber lamina, various laminated end products may be produced. These include insulating sheets, tapes, heat shields, and gasket materials. Laminates that embody structural metal substrates may be produced for use as bulkheads, firewalls, and other lightweight, heat-resistant structural members for use in buildings, aircraft fuselages, and other structures. Ceramic fiber-metal laminates produced in accordance with the present invention may be further processed by drilling, sawing, stamping, or otherwise forming or machining without suffering degradation of the fiber-metal bond.

EXAMPLES

The following examples are included to assist one of ordinary skill in making and using the invention. They are intended as representative examples of the present invention and are not intended in any way to limit the scope of this disclosure or the scope of protection granted by Letters Patent hereon. Commercial sources for ceramic fiber, metal substrate, and inorganic binder sols are indicated in the following examples as illustrations of suitable materials and are not intended to limit the scope of the invention to utilization of only those materials. In some of the examples following, multiple samples of ceramic fiber-metal laminates are bonded in accordance with the present invention. Tables II, through IX, following the examples, summarize the various metal substrates and ceramic fiber matrices that are joined in each example, and may be referred to for convenience as an aid to understanding the examples.

EXAMPLE I

A 1/32 inch thick sheet of aluminosilicate fiber paper (Lydall LYTHERM 970) was bonded to a sheet of 0.00075 inch thick aluminum foil (Reynolds Metals, Inc.). The aluminosilicate fiber paper was prepared for bonding by placement in an electric kiln containing an oxidizing atmosphere. The temperature of the kiln was increased to 1250° F. over the course of one hour, and held at 1250° F. to burn out organic binder constituents. The aluminum foil was not cleaned or preconditioned. The prepared ceramic fiber was laid on top of the metal foil. An aqueous colloidal silica sol was prepared by diluting 50 cubic centimeters of a colloidal silica sol (DuPont LUDOX HS 30) with 950 cubic centimeters of demineralized water. The resulting diluted sol contained 1.81 weight percent silica. The ceramic fiber was wetted with the silica sol, and excess sol was removed by rolling with a tubular glass roller so that no sol would drip from the fiber matrix if the laminate was stood vertically on edge. The joined saturated ceramic paper and aluminum foil were allowed to rest for 15 minutes at 20° C. to precondition the aluminum. The silica sol was gelled by placing the exposed surface of the aluminum foil upon a preheated hotplate. The hotplate surface was maintained at an average temperature of 85° C., resulting in a temperature of the fiber paper near the fiber-metal interface of 65° C. The laminate was allowed to gel and further dry under these conditions for 45 minutes. No additional elevated temperature drying was performed to eliminate chemically bound water. Examination of the metal-fiber interface by cleaving the fiber matrix from the metal substrate revealed full bonding of the ceramic fibers to the metal across the entire interface, with no unbonded areas observed.

TABLE II

| Example | Metal Substrate (Thickness in inches) | Ceramic Fiber Matrix (Thickness in inches) | Inorganic Binder Sol | Inorganic Preconditioning Sol |
|---|---|---|---|---|
| 1 | Aluminum foil (0.00075) | Aluminosilicate (1/32) | 1.81 wt. % silica | — |

EXAMPLE II

The procedure of Example I was repeated, with the exception of the utilization of 0.0015 inch thick aluminum foil (Reynolds) and the separate preconditioning of the aluminum foil prior to application of the ceramic paper to it. A preconditioning solution was prepared by diluting 30 cubic centimeters of colloidal silica sol (DuPont LUDOX HS 30) with 970 cubic centimeters of demineralized water. This diluted sol contained 1.09 weight percent silica. Sufficient sodium hydroxide was added to the diluted sol to adjust the sol's pH to 10.0. The aluminum foil was soaked in this preconditioning sol for 1½ hours at 20° C. The aluminum was then removed from the solution, and excess solution was wiped from the sheet by using a squeegee. The ceramic fiber paper was then applied to the preconditioned aluminum foil, saturated with binder sol, gelled and dried as in the preceding example. Full bonding of fiber to metal along the complete interface was again observed.

TABLE III

| Example | Metal Substrate (Thickness in inches) | Ceramic Fiber Matrix (Thickness in inches) | Inorganic Binder Sol | Inorganic Preconditioning Sol |
|---|---|---|---|---|
| II | Aluminum foil (0.0015) | Aluminosilicate (1/32) | 1.81 wt. % silica pH adjusted | 1.09 wt. % silica, |

EXAMPLE III

Samples of aluminosilicate fiber paper (FIBERFRAX by Standard Oil) were bonded to various metal substrates as listed in Table II. Two samples of ceramic fiber paper, having thicknesses of 1/16 inch and ⅛ inch, were bound to each metal substrate. All ceramic fiber paper samples were conditioned to burn off organic binder constituents by placing the ceramic fiber paper samples in an electric kiln containing an oxidizing atmosphere, raising the temperature to 1250° F. over the course of one hour, and holding that temperature for 15 minutes.

Nine samples of metal substrate were prepared. These were formed from 0.025 inch thick stainless steel 304 alloy, 0.130 inch thick stainless steel 310 alloy, 0.013 inch stainless steel T430 alloy, 0.125 inch thick stainless steel 316 alloy, 0.130 inch stainless steel 317 alloy, 0.025 inch thick aluminum 2024 alloy, 0.025 inch thick aluminum 6061 alloy, 0.025 inch thick aluminum H3003 alloy, and 0.025 inch thick aluminum 2024 aluminum clad alloy. All metal substrates were degreased with acetone to cleanse them of any oil films present, followed by rinsing in warm water. A pH adjusted preconditioning sol was prepared following the procedure of Example II. All metal substrates were soaked in this preconditioning sol for 14 hours at 20° C. Two preconditioned ceramic fiber sheets, having thicknesses of 1/16 inch and ⅛ inch, were laid down and spaced apart on each metal substrate. A silica binding sol was prepared and added to saturate the ceramic fiber sheets following the procedure of Example I. Gelation and drying of the sol were accomplished by laying the exposed surface of each metal sheet upon a hotplate surface. The hotplate surface temperature was maintained at temperatures ranging from 90° C. to 120° C., resulting in a fiber sheet temperature of 70° C. to 90° C. in proximity to the metal interface. Gelation and drying time varied for each sample, but was in the vicinity of 80 minutes in every case. The bond lines produced in each sample were examined by cleaving the fiber paper from the metal substrate. In all test samples, the bonding was found to be continuous, homogeneous, and uniform across the entire interface. Aluminum sheets were folded or bent into a 1/16 inch radiused angle bend. The fiber papers did not delaminate from the radiused corner of the metal substrate when so bent. The dried, bonded fiber sheets in each sample were as resilient as the original fiber sheet before binder burnout.

TABLE IV

| Example | Metal Substrate (Thickness in inches) | Ceramic Fiber Matrix (Thickness in inches) | Inorganic Binder Sol | Inorganic Preconditioning Sol |
|---|---|---|---|---|
| III | Stainless steel 304 (0.025) | Aluminosilicate (1/16) | 1.81 wt. % silica | 1.09 wt. % silica, pH adjusted |
| | Stainless steel 304 (0.025) | Aluminosilicate (⅛) | 1.81 wt. % silica | 1.09 wt. % silica, pH adjusted |
| | Stainless steel 310 (0.130) | Aluminosilicate (1/16) | 1.81 wt. % silica | 1.09 wt. % silica, pH adjusted |
| | Stainless steel 310 (0.130) | Aluminosilicate (⅛) | 1.81 wt. % silica | 1.09 wt. % silica, pH adjusted |
| | Stainless steel T430 (0.013) | Aluminosilicate (1/16) | 1.81 wt. % silica | 1.09 wt. % silica, pH adjusted |
| | Stainless | Aluminо- | 1.81 wt. % | 1.09 wt. % |

TABLE IV-continued

| Example | Metal Substrate (Thickness in inches) | Ceramic Fiber Matrix (Thickness in inches) | Inorganic Binder Sol | Inorganic Preconditioning Sol |
| --- | --- | --- | --- | --- |
| | steel T430 (0.013) | silicate (⅛) | silica | silica, pH adjusted |
| | Stainless steel 316 (0.125) | Alumino-silicate (1/16) | 1.81 wt. % silica | 1.09 wt. % silica, pH adjusted |
| | Stainless steel 316 (0.125) | Alumino-silicate (⅛) | 1.81 wt. % silica | 1.09 wt. % silica, pH adjusted |
| | Stainless steel 317 (0.130) | Alumino-silicate (1/16) | 1.81 wt. % silica | 1.09 wt. % silica, pH adjusted |
| | Stainless steel 317 (0.130) | Alumino-silicate (⅛) | 1.81 wt. % silica | 1.09 wt. % silica, pH adjusted |
| | Aluminum 2024 (0.025) | Alumino-silicate (1/16) | 1.81 wt. % silica | 1.09 wt. % silica, pH adjusted |
| | Aluminum 2024 (0.025) | Alumino-silicate (⅛) | 1.81 wt. % silica | 1.09 wt. % silica, pH adjusted |
| | Aluminum 6061 (0.025) | Alumino-silicate (1/16) | 1.81 wt. % silica | 1.09 wt. % silica, pH adjusted |
| | Aluminum 6061 (0.025) | Alumino-silicate (⅛) | 1.81 wt. % silica | 1.09 wt. % silica, pH adjusted |
| | Aluminum H3003 (0.025) | Alumino-silicate (1/16) | 1.81 wt. % silica | 1.09 wt. % silica, pH adjusted |
| | Aluminum H3003 (0.025) | Alumino-silicate (⅛) | 1.81 wt. % silica | 1.09 wt. % silica, pH adjusted |
| | Aluminum 2024 Alclad (0.025) | Alumino-silicate (1/16) | 1.81 wt. % silica | 1.09 wt. % silica, pH adjusted |
| | Aluminum 2024 Alclad (0.025) | Alumino-silicate (⅛) | 1.81 wt. % silica | 1.09 wt. % silica, pH adjusted |

EXAMPLE IV

Ceramic fiber paper samples having thicknesses of 1/16 inch and ⅛ inch were prepared following the procedure of Example III. Three different metal substrates were prepared, a first formed from aluminum foil, the second from 0.025 inch think aluminum alloy H3003, and the third from 0.025 inch thick stainless steel alloy 304. The metal substrates were preconditioned by soaking in a pH-adjusted silica sol in accordance with the procedure of Example III. The saturation, gelling, and drying procedures of Example III were followed, with the exception of the utilization of a differing concentration of binder sol. Two binder sols were prepared, one containing 2.52 weight percent silica and the other containing 3.62 weight percent silica. Laminate samples were constructed for each possible combination of fiber matrix thickness, metal substrate, and binder concentration, as listed in Table III. The laminates produced in this example exhibited poor resiliency and higher fiber rigidity and strength. The dry fiber matrix portion of the laminate samples was harder and required much more pressure to deform than the laminates produced in Examples I through III. Bonding of the fiber to metal was uniform and strong. When the metal-fiber interface of these samples was placed under a shear stress, the fiber layer sheared internally before shearing along the metal-fiber interface.

TABLE V

| Example | Metal Substrate (Thickness in inches) | Ceramic Fiber Matrix (Thickness in inches) | Inorganic Binder Sol | Inorganic Preconditioning Sol |
| --- | --- | --- | --- | --- |
| IV | Aluminum foil (1/16) | Alumino-silicate silica | 2.52 wt. % pH adjusted | 1.09 wt. % |
| | Aluminum foil | Alumino-silicate (1/16) silica | 3.62 wt. % silicate | " |
| | Aluminum foil | Alumino-silicate (⅛) | 2.52 wt. % silica | " |
| | Aluminum foil | Alumino-silicate (⅛) | 3.62 wt. % silica | " |
| | Aluminum H3003 (0.025) | Alumino-silicate (1/16) | 2.52 wt. % silica | " |
| | Aluminum H3003 (0.025) | Alumino-silicate (1/16) | 3.62 wt. % silica | " |
| | Aluminum H3003 (0.025) | Alumino-silicate (⅛) | 2.52 wt. % silica | " |
| | Aluminum H3003 (0.025) | Alumino-silicate (⅛) | 3.62 wt. % silica | " |
| | Stainless steel 304 (0.025) | Alumino-silicate (1/16) | 2.52 wt. % silica | " |
| | Stainless steel 304 (0.025) | Alumino-silicate (1/16) | 3.62 wt. % silica | " |
| | Stainless steel 304 (0.025) | Alumino-silicate (⅛) | 2.52 wt. % silica | " |
| | Stainless steel 304 (0.025) | Alumino-silicate (⅛) | 3.62 wt. % silica | " |

EXAMPLE V

Two metal substrates were prepared, both 0.025 inch thick, one formed from stainless steel alloy 304 and one from stainless steel alloy H3003. Both metal substrates were preconditioned following the procedure of Example III. Four aluminosilicate ceramic fiber blankets were prepared, all having thicknesses of ½ inch. A first fiber blanket was prepared from a 6 pound/ft³ density KAOWOOL, by Thermal Ceramics, Inc., blanket. A second ceramic fiber blanket was formed from 8 pound/ft³ density KAOWOOL. A third ceramic fiber blanket was formed from 6 pound/ft³ density CERA-CHEM by Manville Corp., blanket. A fourth ceramic fiber blanket was prepared by 8 pound/ft³ density CERACHEM blanket. The ceramic fiber blankets used in this example contained no organic binders, so no preheating to remove organic constituents was required. Prior to joining a sample from each of the ceramic fiber blankets to each of the metal substrates as listed in Table II, the metal substrates were wetted with a binder sol prepared in accordance with the procedures of Example I. One surface of each fiber blanket was then saturated to a depth of ⅛ inch with the same sole. The wetted metal surfaces were then joined to the saturated fiber surfaces, followed by gelation and drying in accordance with the procedures of Example III. Examination of the dried laminate samples showed complete bonding along the entire fiber-metal interface. The resiliency and strength properties of the original fiber blanket were retained in proximity to the exposed second surface of the dry, bonded fiber blanket portions of the laminates.

TABLE VI

| Example | Metal Substrate (Thickness in inches) | Ceramic Fiber Matrix (Thickness in inches) | Inorganic Binder Sol | Inorganic Preconditioning Sol |
|---|---|---|---|---|
| V | Stainless steel 304 (0.025) | KAOWOOL 6 lb/ft$^3$ (⅛) | 1.82 wt. % silica | 1.09 wt. % silica pH adjusted |
| | Stainless steel 304 (0.025) | KAOWOOL 8 lb/ft$^3$ (⅛) | 1.82 wt. % silica | 1.09 wt. % silica pH adjusted |
| | Stainless steel 304 (0.025) | CERACHEM 6 lb/ft$^3$ (⅛) | 1.82 wt. % silica | 1.09 wt. % silica pH adjusted |
| | Stainless steel 304 (0.025) | CERACHEM 8 lb/ft$^3$ (⅛) | 1.82 wt. % silica | 1.09 wt. % silica pH adjusted |
| | Stainless steel H3003 (0.025) | KAOWOOL 6 lb/ft$^3$ (⅛) | 1.82 wt. % silica | 1.09 wt. % silica pH adjusted |
| | Stainless steel H3003 (0.025) | KAOWOOL 8 lb/ft$^3$ (⅛) | 1.82 wt. % silica | 1.09 wt. % silica pH adjusted |
| | Stainless steel H3003 (0.025) | CERACHEM 6 lb/ft$^3$ (⅛) | 1.82 wt. % silica | 1.09 wt. % silica pH adjusted |
| | Stainless steel H3003 (0.025) | CERACHEM 8 lb/ft$^3$ (⅛) | 1.82 wt. % silica | 1.09 wt. % silica pH adjusted |

EXAMPLE VI

Two ceramic fiber-metal laminates were prepared in accordance with the procedures of Example III. The ceramic fiber matrices used were the same as utilized in Example III, while the metal substrates used were formed from 0.0015 inch thick aluminum foil and 0.025 inch thick aluminum alloy H3003 (see Table II). After gelation and drying, another 1/16 inch thick fiber paper lamina was joined to the exposed metal surface of each laminate sample. These additional fiber paper lamina were preconditioned to burn out organic binders, applied to the second surfaces of the metal substrates, and saturated with sol in accordance with the procedures of Example III. Gelling and drying were accomplished under the time and temperature conditions of Example III, but heat was applied to the exposed second surface of the dry, first ceramic fiber lamina. The second metal-fiber interfaces formed between the original laminate samples and the additional ceramic fiber lamina were examined after drying and were found to exhibit uniform bonding.

TABLE VII

| Example | Metal Substrate (Thickness in inches) | Ceramic Fiber Matrix (Thickness in inches) | Inorganic Binder Sol | Inorganic Preconditioning Sol |
|---|---|---|---|---|
| VI | Aluminum foil (0.0015) | 2 Lamina of Aluminosilicate (1/16) | 1.81 wt. % silica | 1.09 wt. % silica pH adjusted |
| | Aluminum H3003 (0.025) | 2 Lamina of Aluminosilicate (1/16) | 1.81 wt. % silica | 1.09 wt. % silica pH adjusted |

EXAMPLE VII

Aluminosilicate ceramic fiber paper having a 1/16 inch thickness was prepared in accordance with the procedures of Example I. Three metal substrates were prepared, each having a thickness of 0.025 inches, and formed from stainless steel 304 alloy, aluminum 2024 alloy, and aluminum H3003 alloy (see Table II). Each metal substrate was degreased with acetone, followed by rinsing with warm water. A preconditioning solution was prepared by diluting 40 cubic centimeters of NYACOL colloidal alumina, containing 20.2 percent alumina ($Al_2O_3$) by weight, with 460 cubic centimeters of demineralized water. This preconditioning solution had an alumina concentration of 1.8 percent by weight and a pH of 3.60. The metal sheets were soaked in this preconditioning sol for 5 hours at a temperature of 20° C. The pH of the sol after soaking was 3.96. Excess preconditioning sol was wiped from the metal sheets just prior to application of samples of the ceramic fiber papers thereon. An alumina binder sol was prepared by diluting 60 cubic centimeters of NYACOL colloidal alumina sol with 940 cubic centimeters of demineralized water. This binder sol had an alumina concentration of 1.4 percent by weight. The prepared ceramic fiber samples were laid onto the freshly preconditioned metal surfaces and saturated with the alumina binder sol. The fiber pieces were rolled with a glass roller to remove excess binder sol. Gelation and drying were accomplished by laying the exposed second side of the metal substrates onto a heated hotplate. The hotplate surface temperature was maintained between 70° C. and 90° C. for 2 hours. Both samples were then examined for fiber-to-metal bonding, and were found to have continuous bonding across the entire metal-fiber interface. Each laminate was bent at a 1/16 inch radiused right angle with no delamination observed at the radial corner. The fiber matrix portion of each dry laminate sample was found to be as resilient as the original fiber matrix before binder burnout.

The stainless substrate with 1/16 inch aluminosilicate fiber laminate was dried for one-half hour at 350° C. (625° F.) and the bonding reexamined and found to be homogeneous and uniform.

TABLE VIII

| Example | Metal Substrate (Thickness in inches) | Ceramic Fiber Matrix (Thickness in inches) | Inorganic Binder Sol | Inorganic Preconditioning Sol |
|---|---|---|---|---|
| VII | Stainless steel 304 (0.025) | Aluminosilicate (1/16) | 1.4 wt. % Alumina | 1.8 wt. % Alumina |
| | Aluminum 2024 (0.025) | Aluminosilicate (1/16) | 1.4 wt. % Alumina | 1.8 wt. % Alumina |
| | Aluminum H3003 (0.025) | Aluminosilicate (1/16) | 1.4 wt. % Alumina | 1.8 wt. % Alumina |

EXAMPLE VIII

Two samples of 2.0 inch thick ceramic matrices were formed from Fiberglass batting (Manville Corp.) having a density of 1.6 pound per cubic foot. The fiberglass samples were conditioned to burn off organic binder constituents by placing the samples in an electric kiln containing an oxidizing atmosphere, raising the temperature to 800° F. over the course of one hour, and holding that temperature for two hours.

Two metal substrate samples were prepared; one from 0.025 inch thick aluminum H3003 alloy and one from 0.025 inch thick stainless steel 304 alloy. Each metal substrate was cleansed with acetone to remove any oil film present, followed by a rinse with warm water. A pH adjusted silica preconditioning sol was prepared following the procedure of Example II. Each metal substrate was soaked in this preconditioning sol for one-half hour at 20° C.

One surface of each preconditioning metal substrate was wetted with a silica binder sol prepared in accordance with the procedure of Example I. One surface of each fiberglass matrix sample was saturated to a depth of ⅛ inch with the same binder sol. The saturated side of one fiberglass matrix was then applied to the wetted side of each metal substrate, followed by gelation and drying of the binder sol in accordance with the procedures of Example III.

Examination of the dried laminate samples showed complete bonding along the entire fiber-metal interface. The resiliency and strength properties of the original fiber blanket were retained in proximity to the exposed second surface of the dry, bonded fiber matrix portion of the laminate samples.

TABLE IX

| Example | Metal Substrate (Thickness in inches) | Ceramic Fiber Matrix (Thickness in inches) | Inorganic Binder Sol | Inorganic Preconditioning Sol |
|---|---|---|---|---|
| VIII | Aluminum, H3003 alloy (0.025) | Fiberglass (2.0) | 1.81 wt. % silica | 1.09 wt. % silica, pH adjusted |
|  | Stainless steel, 304 alloy (0.025) | Fiberglass (2.0) | 1.81 wt. % silica | 1.09 wt. % silica, pH adjusted |

CONCLUSION

In summary, as shown by the foregoing examples, the inorganic fiber-metal laminates produced in accordance with the method of the following invention exhibit excellent fiber-to-metal bonding. Very low concentrations of inorganic binder are used, and no additional adhesive is required. The resulting laminates exhibit high resiliency, although higher concentrations of inorganic binder may be used to produce a stiffer laminate.

The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. It is therefore intended that the scope of Letters Patent granted hereon be limited only by the definitions contained in the appended claims and equivalents thereof.

The embodiments of the invention in which an exclusive property or privilege is claimed are defined as follows:

1. A method for producing a laminate comprising a metal substrate, said metal substrate having a first side and a second side, an inorganic fiber matrix, said inorganic fiber matrix having a first side and a second side, and an inorganic binder binding said first side of said metal substrate to said first side of said inorganic fiber matrix, said method comprising:

preconditioning said first side of said metal substrate by contacting said first side with a preconditioning sol containing said inorganic binder dispersed in a liquid dispersant for a period of time of at least five minutes sufficient to activate said first side of said metal substrate;

saturating at least said first side of said inorganic fiber matrix with a binder sol containing said inorganic binder in a quantity and concentration such that said inorganic binder constitutes less than 10 percent of the total weight of said inorganic binder plus said inorganic fiber matrix after drying;

applying said first side of said inorganic fiber matrix to said first side of said metal substrate to form a laminate;

gelling said binder sol; and drying said laminate to remove said liquid dispersant from said gelled binder sol thereby binding said fiber matrix to said first side of said metal substrate.

2. The method of claim 1, wherein said metal substrate is preconditioned before said fiber matrix is applied to said metal substrate.

3. The method of claim 1, wherein said preconditioning sol and binder sol comprise metal oxides in colloidal solution.

4. The method of claim 3 wherein said colloidal solution is an aqueous colloidal solution.

5. The method of claim 3, wherein said metal substrate is formed from a metal selected from the group consisting of aluminum, aluminum alloys, stainless steels, and refractory alloys containing nickel, chromium, cobalt, tungsten, and columbium, for example.

6. The method of claim 5, wherein the inorganic fibers in said matrix are formed from a ceramic selected from the group consisting of glass, aluminosilicates, alumina, silica, zirconia, zircon, and spinel that contains chromium.

7. The method of claim 6, wherein said inorganic binder is selected from the group consisting of silica, zirconia, and alumina.

8. The method of claim 7, wherein said liquid dispersant is water.

9. The method of claim 8, wherein said inorganic binder constitutes less than 1 percent of the total weight of said inorganic binder plus said inorganic fiber matrix after said drying.

10. The method of claim 9, wherein said inorganic fiber matrix is preformed and the individual inorganic fibers therein are bound to each other.

11. The method of claim 10, further comprising the heating of a preformed inorganic fiber matrix containing an organic binder at a temperature in excess of 450° F. in an oxidizing atmosphere to remove said organic binder before saturating said first side of said inorganic fiber matrix with said binder sol.

12. The method of claim 10, wherein the weight percent of said inorganic binder in said binder sol used to saturate said inorganic fiber matrix is variable to effect the flexibility of the inorganic fiber matrix after gelling and drying, with the flexibility of the dried inorganic fiber matrix being substantially the same as that of the inorganic fiber matrix before saturation when binder sol containing approximately 0.36 weight percent inorganic binder is used, and with the flexibility of the dried inorganic fiber matrix decreasing as the weight percent of inorganic binder in the binder sol is increased to approximately 4.3 percent.

13. The method of claim 12, wherein said binder sol is an aqueous silica sol containing 0.36 percent to 3.6 percent silica by weight.

14. The method of claim 13, wherein said preconditioning sol is an aqueous silica sol containing at least 0.18 percent silica by weight and said metal substrate is contacted with said preconditioning sol.

15. The method of claim 14, wherein a base is added to said preconditioning sol to raise the preconditioning sol's alkalinity before preconditioning said metal substrate.

16. The method of claim 15, wherein said preconditioning sol contains approximately 1.1 percent silica by weight and said base is sodium hydroxide, said sodium hydroxide being added to said preconditioning sol to adjust the pH to between 9.8 and 10.2.

17. The method of claim 16, further comprising cleaning said first side of said metal substrate, prior to preconditioning said metal substrate, to remove any oil film and contaminants.

18. The method of claim 12, wherein said binder sol is an aqueous alumina sol containing 0.36 percent to 3.6 percent alumina by weight.

19. The method of claim 12, wherein said binder sol is an aqueous zirconia sol containing 0.36 percent to 4.3 percent zirconia by weight.

20. The method of claim 10, wherein said preformed inorganic fiber matrix has a thickness of less than 0.25 inch, and wherein said inorganic fiber matrix is applied over said metal substrate with said first surface of said inorganic fiber matrix contacting said first surface of said metal substrate, said binder sol is introduced onto said second surface of said inorganic fiber matrix, and said second surface of said inorganic fiber matrix is rolled with a rigid roller to saturate the entire inorganic fiber matrix with said binder sol.

21. The method of claim 20, wherein said first side of said metal substrate is not preconditioned before application of said inorganic fiber matrix, said binder sol acts as said preconditioning sol, and wherein said applied saturated inorganic fiber matrix and said metal substrate are allowed to set for a minimum of five minutes before said gelling to precondition said first surface of said metal substrate by contacting with said binder sol present in said saturated inorganic fiber matrix.

22. The method of claim 20, wherein said metal substrate is formed from metal foil, said binder sol is an aqueous silica sol containing between 1.4 percent and 2.5 percent silica by weight, and said laminate is flexible.

23. The method of claim 20, wherein said metal substrate is formed from metal foil, said binder sol is an aqueous alumina sol containing between 0.6 percent and 2.5 percent alumina by weight, and said laminate is flexible.

24. The method of claim 20 wherein said metal substrate is formed from metal foil, said binder sol is an aqueous zirconia sol containing between 1.0 percent and 3.5 percent zirconia by weight, and said laminate is flexible.

25. The method of claim 10, wherein said preformed inorganic fiber matrix has a thickness of greater than 0.25 inch, further comprising coating said first side of said preconditioned metal substrate with said binder sol, introducing said binder sol to said first side of said inorganic fiber matrix to saturate said first side to a depth of approximately 0.125 inch, and then applying said saturated first side of said inorganic fiber matrix to said coated first side of said metal substrate.

26. The method of claim 25, further comprising the introduction of a binder sol to said second surface of said inorganic fiber matrix after said drying of said laminate, and thereafter gelling and drying the binder sol at said second surface of said inorganic fiber matrix to harden said second surface.

27. The method of claim 10, wherein said gelling of said binder sol is affected by heating said second surface of said metal substrate, causing said inorganic binder in said binder sol to migrate toward said first side of said metal substrate to strengthen the bonding of said metal substrate to said inorganic fiber matrix and to reduce the amount of binder present in proximity to said second surface of said inorganic fiber matrix.

28. The method of claim 27, wherein heat is applied to said second surface of said metal substrate at a sufficient intensity and rate to maintain the temperature of said inorganic fiber matrix between the range of 104° F. to 160° F. in proximity to said first side of said inorganic fiber matrix during said gelling of said binder sol.

29. The method of claim 10, further comprising the binding of at least one additional inorganic fiber matrix to said laminate after drying by:
  preconditioning said second side of said metal substrate by contacting said second side with said preconditioning sol;
  saturating at least a first side of said additional inorganic fiber matrix with a binder sol;
  applying said first side of said additional inorganic fiber matrix to said second side of said metal substrate to build up said laminate;
  gelling said binder sol; and
  drying said laminate to remove said liquid dispersant from said gelled binder sol.

30. The method of claim 10, further comprising the binding of at least one additional metal substrate to said laminate after drying by:
  preconditioning a first side of said additional metal substrate by contacting said first side with said preconditioning sol;
  saturating said second side of said inorganic fiber matrix with said binder sol;
  applying said second side of said inorganic fiber matrix to said first side of said additional metal substrate to build up said laminate;
  gelling said binder sol; and
  drying said laminate to remove said liquid dispersant from said gelled binder sol.

31. The method of claim 1, wherein said first side of said inorganic fiber matrix is saturated with a binder sol containing said inorganic binder in a quantity and concentration such that within said saturated first side said inorganic binder constitutes less than 10% of the total weight of said inorganic binder plus said inorganic fiber matrix after drying.

32. A method for producing a laminate comprising a metal substrate, said metal substrate having a first side and a second side, an inorganic fiber matrix, said inorganic fiber matrix having a first side and a second side, and an inorganic binder binding said first side of said metal substrate to said first side of said inorganic fiber matrix, said method comprising:
  preconditioning said first side of said metal substrate by contacting said first side with a preconditioning sol of said inorganic binder dispersed in a liquid dispersant for a period of time of at least five minutes sufficient to activate said first side of said metal substrate, said preconditioning sol having been pH adjusted by the addition of a base to raise the alkalinity of the preconditioning sol;
  saturating at least said first side of said inorganic fiber matrix with a binder sol of said inorganic binder;
  applying said first side of said inorganic fiber matrix to said first side of said metal substrate to form a laminate;
  gelling said binder sol; and
  drying said laminate to remove said liquid dispersant from said gelled binder sol, thereby binding said fiber matrix to said first side of said metal substrate.

* * * * *

UNITED STATES PATENT AND TRADEMARK OFFICE
CERTIFICATE OF CORRECTION

PATENT NO. : 5,190,610
DATED : March 2, 1993
INVENTOR(S) : Roger B. EK

It is certified that error appears in the above-indentified patent and that said Letters Patent is hereby corrected as shown below:

| Column | Line | | | |
|---|---|---|---|---|
| 1 | 51 | "application" should read --applications--. | | |
| 2 | 36 | "temperature" should read --temperatures--. | | |
| 7 | 42 | "sealing" should read --scaling--. | | |
| 8 | 17 | "to" should read --so--. | | |
| 8 | 18 | "too" should read --to--. | | |
| 14 (TABLE V) | 9 & 10 | "Aluminum foil (1/16) | Alumino- silica | 3.62wt.% | should read

--Aluminum foil (1/16)   Alumino- silicate silica   3.62 wt.%

UNITED STATES PATENT AND TRADEMARK OFFICE
CERTIFICATE OF CORRECTION

PATENT NO.  : 5,190,610
DATED       : March 2, 1993
INVENTOR(S) : Roger B. EK

It is certified that error appears in the above-indentified patent and that said Letters Patent is hereby corrected as shown below:

Column 14, line 62, "sole". should read --sol. --.

Column 17, line 6, "preconditioning" should read --preconditioned --.

Signed and Sealed this

First Day of March, 1994

Attest:

BRUCE LEHMAN

Attesting Officer

Commissioner of Patents and Trademarks